(12) United States Patent
Inami

(10) Patent No.: US 12,060,065 B2
(45) Date of Patent: Aug. 13, 2024

(54) VEHICLE CONTROL SYSTEM

(71) Applicant: Hitachi Astemo, Ltd., Hitachinaka (JP)

(72) Inventor: Ken Inami, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 527 days.

(21) Appl. No.: 17/293,385

(22) PCT Filed: Nov. 27, 2019

(86) PCT No.: PCT/JP2019/046277
§ 371 (c)(1),
(2) Date: May 12, 2021

(87) PCT Pub. No.: WO2020/116266
PCT Pub. Date: Jun. 11, 2020

(65) Prior Publication Data
US 2022/0009499 A1   Jan. 13, 2022

(30) Foreign Application Priority Data

Dec. 7, 2018 (JP) .................................. 2018-229590

(51) Int. Cl.
*B60W 40/02* (2006.01)
*B60W 10/18* (2012.01)
(Continued)

(52) U.S. Cl.
CPC ............ *B60W 40/02* (2013.01); *B60W 10/18* (2013.01); *B60W 10/20* (2013.01); *B60W 50/16* (2013.01);
(Continued)

(58) Field of Classification Search
None
See application file for complete search history.

(56) References Cited

U.S. PATENT DOCUMENTS 6,035,053 A   3/2000 Yoshioka et al.
10,919,528 B2 * 2/2021 Bae ....................... B60W 50/14
(Continued)

FOREIGN PATENT DOCUMENTS

JP   H10-100820 A   4/1998
JP   H10-105891 A   4/1998
(Continued)

OTHER PUBLICATIONS

International Search Report, PCT/JP2019/046277, Mar. 17, 2020 (4 pgs).

*Primary Examiner* — Abdhesh K Jha
*Assistant Examiner* — Jonathan E Reinert
(74) *Attorney, Agent, or Firm* — Volpe Koenig

(57) ABSTRACT

Provided is a technique for controlling a vehicle according to a group type for a target group moving object. Provided are: a group detection unit 102 that detects a group based on signals from sensors 101; an environment information collection unit 105 that collects information on a surrounding environment of a host vehicle; a group type determination unit 103 that determines a group type based on a feature of the group detected by the group detection unit 102 and environment information collected by the environment information collection unit 105; and a risk level determination unit 104 that determines a risk level based on the group type determined by the group type determination unit 103, a speed of the host vehicle and a distance to a group moving object. A warning or vehicle control is performed based on the risk level determined by the risk level determination unit 104.

9 Claims, 10 Drawing Sheets

(51) Int. Cl.
*B60W 10/20* (2006.01)
*B60W 50/14* (2020.01)
*B60W 50/16* (2020.01)

(52) U.S. Cl.
CPC . *B60W 2050/146* (2013.01); *B60W 2420/403* (2013.01); *B60W 2420/408* (2024.01); *B60W 2554/404* (2020.02); *B60W 2554/80* (2020.02); *B60W 2556/45* (2020.02)

(56) References Cited

U.S. PATENT DOCUMENTS

| | | | |
|---|---|---|---|
| 2011/0140919 A1 | 6/2011 | Hara et al. | |
| 2013/0223686 A1 | 8/2013 | Shimizu et al. | |
| 2019/0088136 A1* | 3/2019 | Nagata | G08G 1/163 |
| 2019/0129432 A1* | 5/2019 | Russell | G06V 20/58 |
| 2020/0094829 A1 | 3/2020 | Ohmura et al. | |

FOREIGN PATENT DOCUMENTS

| | | | |
|---|---|---|---|
| JP | 2011-123636 A | 6/2011 |
| JP | 5475138 A | 2/2014 |
| JP | 2016-177722 A | 10/2016 |
| JP | 2018-154216 A | 10/2018 |

* cited by examiner

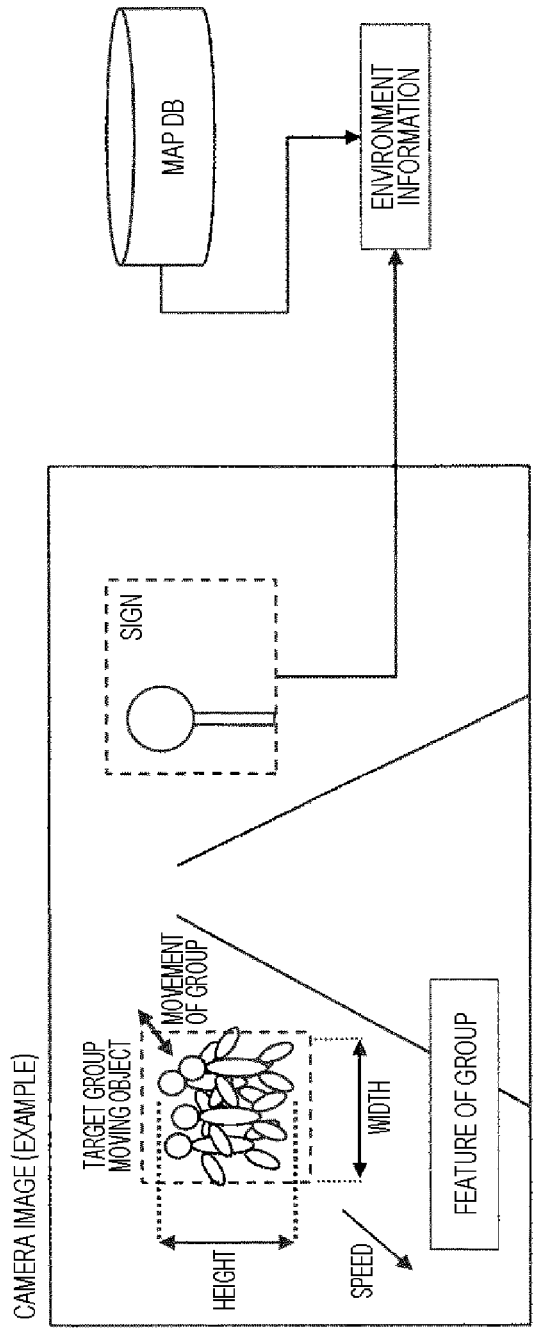

FIG. 6

| FEATURE POINT | | | | ENVIRONMENT INFORMATION | | GROUP TYPE |
|---|---|---|---|---|---|---|
| HEIGHT | WIDTH | MOVEMENT OF GROUP (CHANGE AMOUNT OF HEIGHT OR WIDTH) | SPEED (CONFIRMATION BY TIME DIFFERENCE) | MAP INFORMATION | SIGNS | |
| LOW | - | - | WALKING SPEED | SCHOOL ZONE | SCHOOL ZONE | CHILDREN |
| HIGH | - | - | WALKING SPEED | - | - | ADULTS |
| - | - | MOVING LITTLE | WALKING SPEED | THERE IS EVENT VENUE NEARBY | - | ALIGNED GROUP |
| - | WIDE | MOVING WELL | WALKING SPEED | THERE IS BICYCLE LANE | - | CUMBERSOME GROUP |
| - | - | - | BICYCLE SPEED (DETECTION OF BICYCLE) | THERE IS BICYCLE LANE | THERE IS BICYCLE LANE | BICYCLES RUNNING SIDE BY SIDE |
| - | - | MOVING LITTLE | - | THERE IS BUS STOP NEARBY | SIGN OF BUS STOP | GROUP DURING BOARDING OR DEBOARDING |
| - | - | - | - | GROUP IS DETECTED ON INNER SIDE OF GUARDRAIL | DETECTION OF GUARDRAIL | GROUP IN FRONT OF GUARDRAIL |

FIG. 7

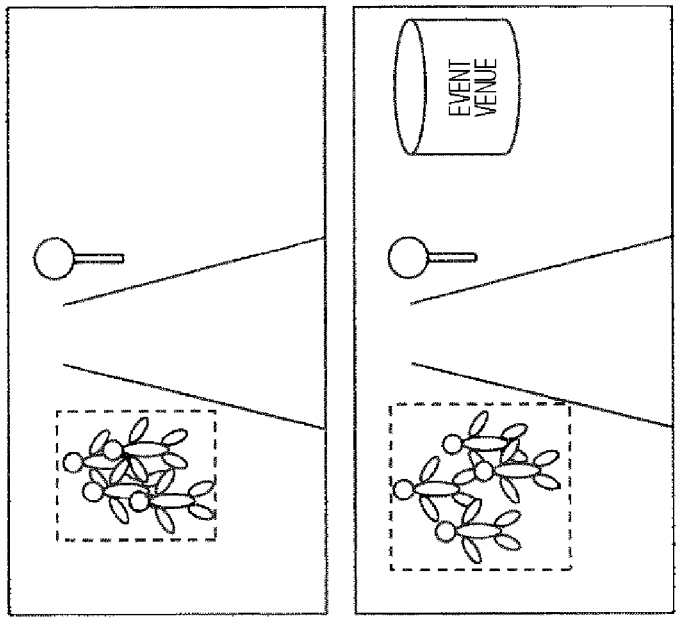

| GROUP TYPE | HOST VEHICLE SPEED | DISTANCE TO GROUP | WARNING | BRAKE CONTROL | STEERING CONTROL | AEB PREPARATION |
|---|---|---|---|---|---|---|
| GROUP OF ADULTS | LESS THAN 10km/h (SLOW) | CLOSE | PRESENCE | ABSENCE | ABSENCE | ABSENCE |
| | | FAR | ABSENCE | ABSENCE | ABSENCE | ABSENCE |
| | 10km/h TO 60km/h | CLOSE | PRESENCE | ABSENCE | SEPARATE | ABSENCE |
| | | FAR | ABSENCE | ABSENCE | ABSENCE | ABSENCE |
| | 60km/h OR MORE | CLOSE | PRESENCE | DECELERATION | SEPARATE | ABSENCE |
| | | FAR | PRESENCE | DECELERATION | ABSENCE | ABSENCE |
| CUMBERSOME GROUP | LESS THAN 10km/h (SLOW) | CLOSE | PRESENCE | ABSENCE | SEPARATE | PRESENCE |
| | | FAR | PRESENCE | ABSENCE | ABSENCE | PRESENCE |
| | 10km/h TO 60km/h | CLOSE | PRESENCE | DECELERATION | SEPARATE | PRESENCE |
| | | FAR | PRESENCE | DECELERATION | ABSENCE | PRESENCE |
| | 60km/h OR MORE | CLOSE | PRESENCE | STRONG DECELERATION | SEPARATE | PRESENCE |
| | | FAR | PRESENCE | STRONG DECELERATION | ABSENCE | PRESENCE |

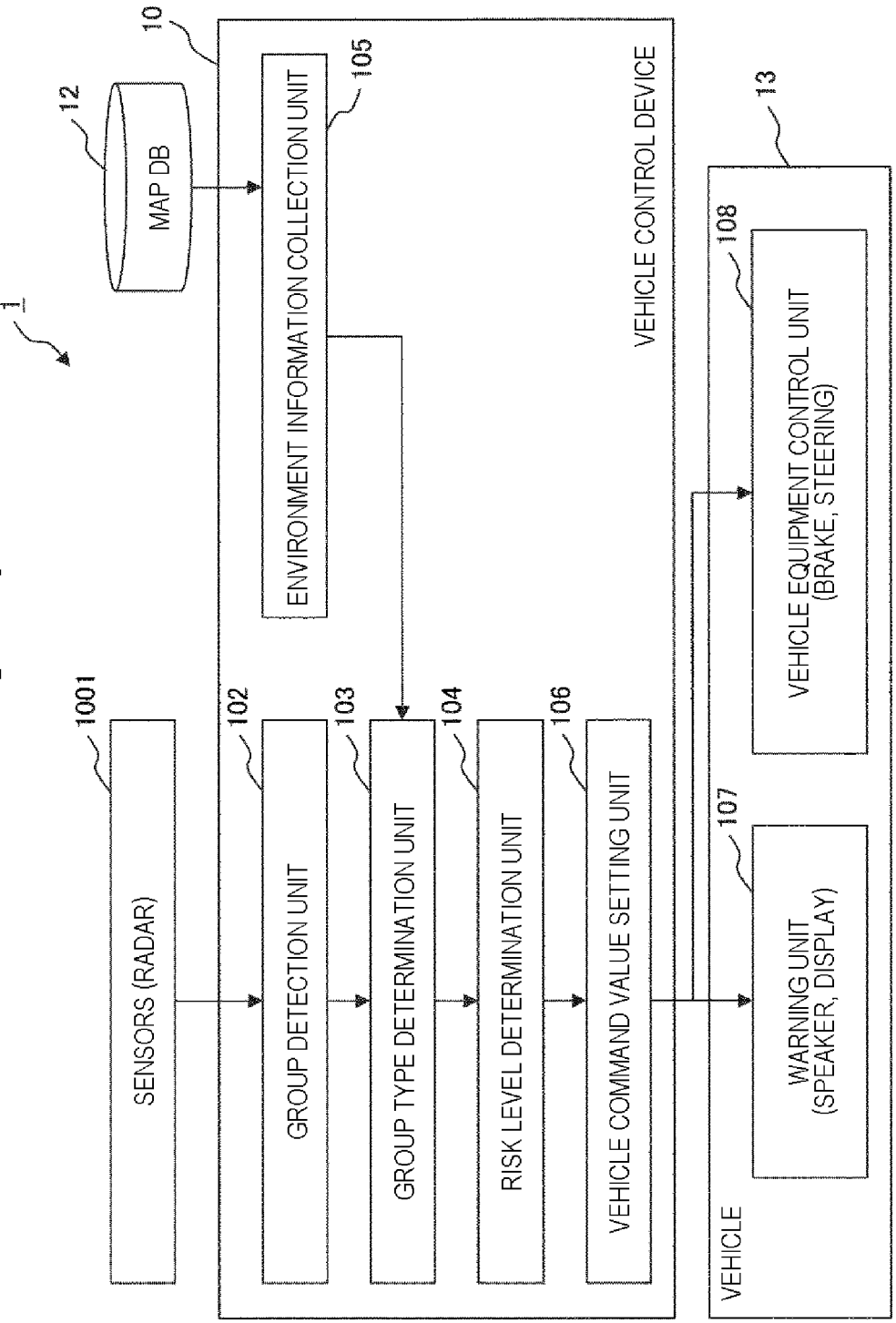

VEHICLE CONTROL SYSTEM

TECHNICAL FIELD

The present invention relates to a vehicle control system that controls traveling of an automobile.

BACKGROUND ART

Conventionally, there is a technique for detecting a moving object such as a pedestrian and a bicycle using a camera or a radar mounted on a vehicle, predicting a behavior of the moving object based on a speed and a direction of the moving object, and controlling braking and steering of the vehicle to avoid a risk such as jumping out of the pedestrian when there is the risk.

Further, there is a technique for predicting the existence of a pedestrian or a bicycle in a blind spot of a sensor by using information on a surrounding environment of a host vehicle position based on map information and giving a warning to a driver. As such a technique, for example, there is proposed a technique described in PTL 1 is proposed.

CITATION LIST

Patent Literature

PTL 1: Japanese Patent No. 5475138

SUMMARY OF INVENTION

Technical Problem

In the technique described in PTL 1, however, a behavior is predicted only for a certain moving object from information on a surrounding environment, but there is no consideration on the behavior prediction of a group moving object formed of a plurality of moving objects.

When a plurality of moving objects existing at a long distance are detected using a camera or a radar, it is difficult to detect each of the moving objects due to an overlap between the moving objects and a limit of resolution. Therefore, first of all, it is necessary to enable early control of the vehicle by detecting the plurality of moving objects as a mass of moving objects (group moving object) at an early stage. Further, it is unknown whether the detected group moving object is a group moving object to be noted, and thus, it is necessary to identify what kind of group moving object the group moving object is.

An object of the present invention is to provide a vehicle control system capable of determining a group type based on a feature of a group moving object and a surrounding environment of a host vehicle and controlling a vehicle suitable for such a situation.

Solution to Problem

In order to achieve the above object, the present invention relates to a vehicle control system which controls a vehicle based on signals from sensors, including: a group detection unit that detects a group based on the signals from the sensors; an environment information collection unit that collects information on a surrounding environment of a host vehicle; and a group type determination unit that determines a group type based on a feature of the group detected by the group detection unit and the environment information collected by the environment information collection unit, and performing a warning or vehicle control based on the group type determined by the group type determination unit, a speed of the host vehicle, and a distance to a group moving object.

Advantageous Effects of Invention

According to the present invention, it is possible to provide the vehicle control system capable of determining the group type based on the feature of the group moving object and the surrounding environment of the host vehicle and controlling the vehicle suitable for such a situation.

BRIEF DESCRIPTION OF DRAWINGS

FIG. 5 is an image view for describing an example using a stereo camera according to the first example of the present invention.

FIG. 6 is a matrix view of a group type corresponding to a feature point and environment information according to the first example of the present invention.

FIG. 7 is a matrix view illustrating vehicle control corresponding to a group type, a host vehicle speed, and a distance to a group according to the first example of the present invention.

FIG. 10 is a block diagram of a vehicle control system for a vehicle according to a third example of the present invention.

DESCRIPTION OF EMBODIMENTS

Hereinafter, an embodiment and examples of the vehicle control system according to the present invention will be described with reference to the drawings. The present invention is not limited to the following embodiment and examples, but includes various modifications and application examples within a technical concept of the present invention.

Figure 1:
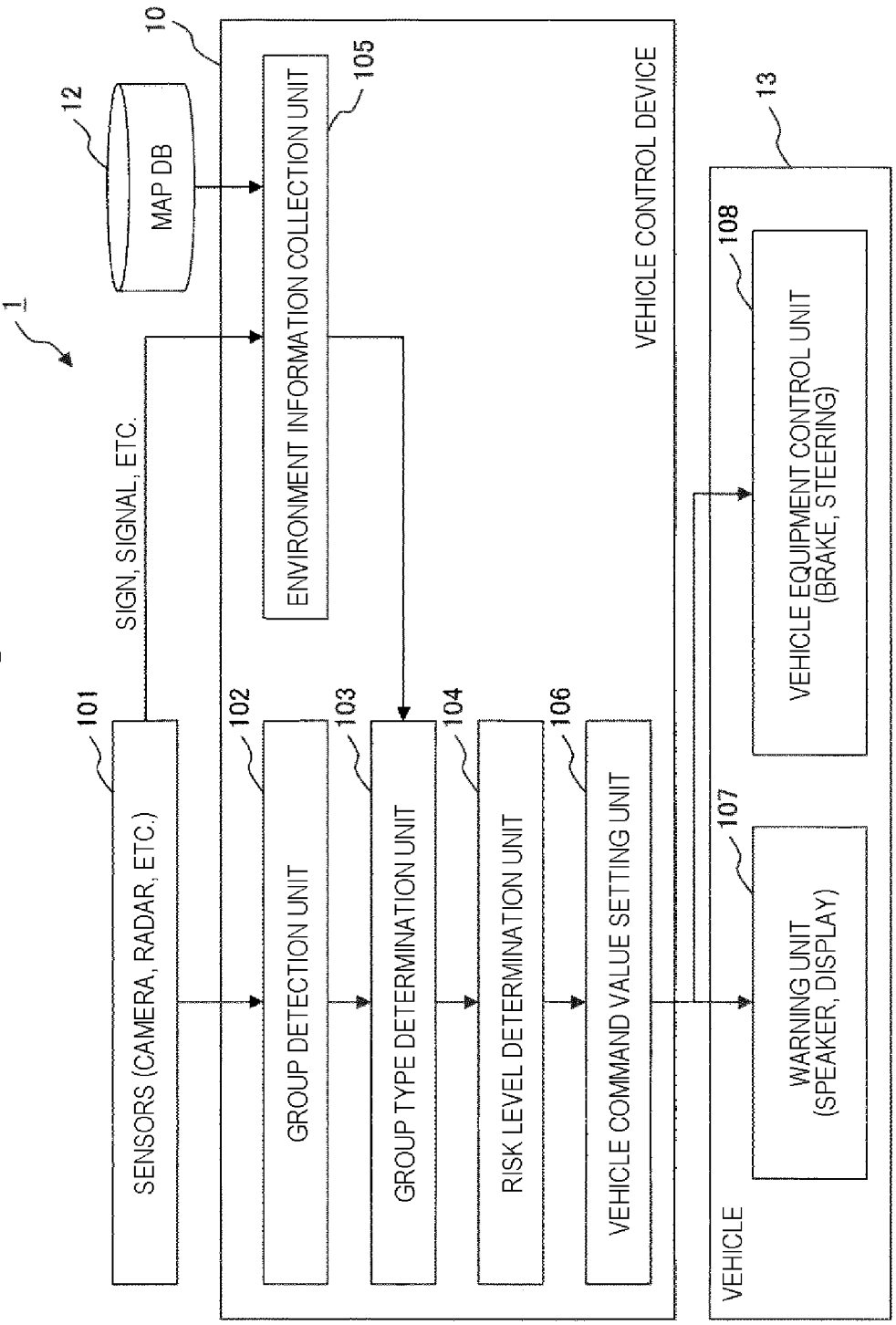
FIG. 1 is a block diagram of a vehicle control system for a vehicle according to an embodiment of the present invention.

FIG. 1 is a block diagram of a vehicle control system for a vehicle according to the embodiment of the present invention. A vehicle control system 1 in the present embodiment is constituted by a read only memory (ROM) configured to store a traveling control algorithm, a central processing unit (CPU) that executes various calculation processes, and a random access memory (RAM) that stores calculation results.

Sensors 101 are formed of sensing by a camera, a radar, or the like, and are a mechanism for sending information detected by sensors to a group detection unit 102 and an environment information collection unit 105. As the sensors, for example, a single camera, a stereo camera, an infrared laser, a millimeter-wave radar, and the like, which are optical cameras, are used.

The vehicle control device 10 according to the present embodiment includes the group detection unit 102, a group type determination unit 103, a risk level determination unit 104, the environment information collection unit 105, and a vehicle command value setting unit 106. These configurations are programs which are executed by the CPU. Each configuration operates as follows.

The group detection unit 102 detects a target group moving object from detection information of a moving object transmitted from the sensors 101, and transmits information on the detected target group moving object to the group type determination unit 103. The group referred to in the present embodiment means a plurality of two or more people.

The environment information collection unit 105 collects and integrates pieces of information on signs and signals detected from the sensors 101 and information on a position of a host vehicle and surrounding buildings obtained from a map database (map DB 12), and transmits environment information at a current position of the host vehicle to the group type determination unit 103. Information on the position of the host vehicle is acquired by receiving, for example, a global positioning system (GPS) signal.

The group type determination unit 103 determines what kind of group type the target group moving object is based on a feature of the target group moving object transmitted from the group detection unit 102 and the environment information transmitted from the environment information collection unit 105, and transmits information on the group type to the risk level determination unit 104.

The risk level determination unit 104 determines a risk level of a collision between the group moving object and the host vehicle based on the group type determined by the group type determination unit 103 and situations of the host vehicle and the target group moving object, sets a vehicle control policy, and transmits the information thereof to the vehicle command value setting unit 106.

The vehicle command value setting unit 106 sets a control command value according to the actual vehicle from the control policy obtained from the risk level determination unit 104, and transmits a control signal to the warning unit 107 and the vehicle equipment control unit 108 of the vehicle 13.

The warning unit 107 performs a warning to a driver in response to the control signal transmitted from the vehicle command value setting unit 106 using a speaker that generates a voice or a warning sound, a display that displays the warning, and a vibrator that vibrates a steering wheel. In the present embodiment, the warning by the warning unit 107 is also a part of the vehicle control.

The vehicle equipment control unit 108 controls a brake device that applies a braking force to the vehicle 13 and a steering operation for avoiding a risk in response to the control signal transmitted from the vehicle command value setting unit 106.

Further, signals are transmitted and received using a controller area network (CAN), Ethernet (registered trademark), or the like which are generally used as an in-vehicle network.

Figure 2:
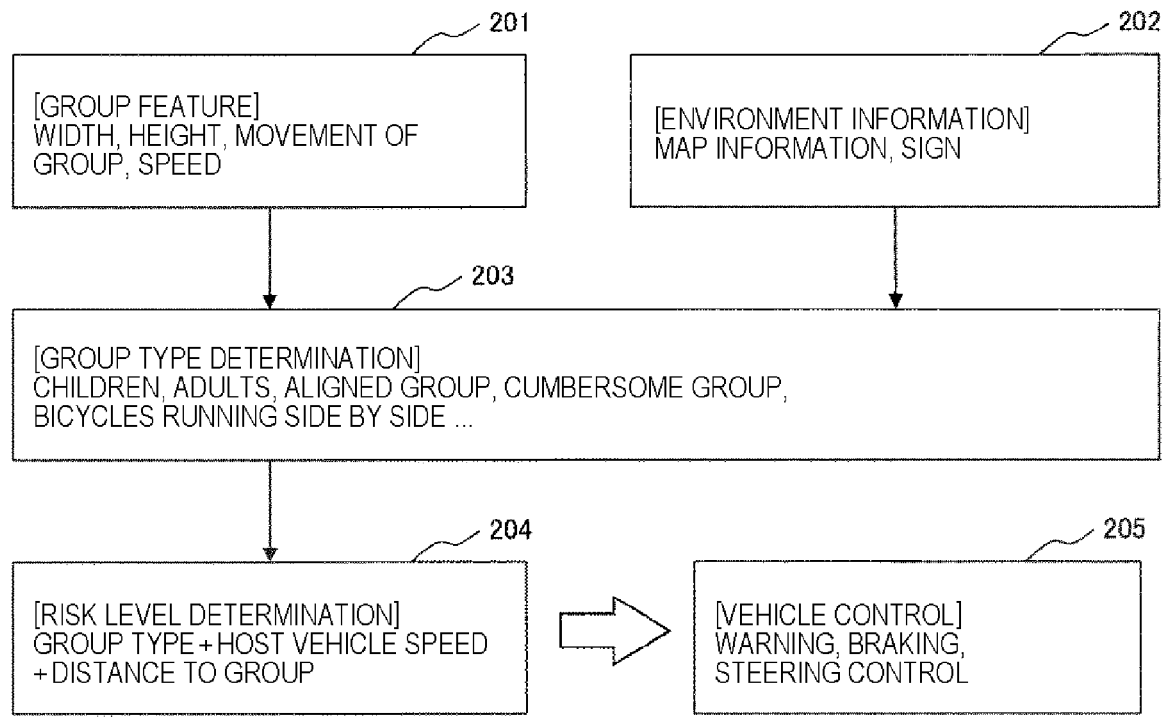
FIG. 2 is a processing flow diagram of a group type determination unit according to the embodiment of the present invention.

Next, the processing of the group type determination unit 103 will be described with reference to FIG. 2. FIG. 2 is a processing flow diagram of the group type determination unit 103 according to the embodiment of the present invention.

A group feature 201 has elements such as a width, a height, a group movement, and a speed as features for a group moving object detected by the group detection unit 102.

The environment information 202 has map information and sign information obtained by the environment information collection unit 105.

In group type determination 203, any group type in which a target group moving object is included is determined based on information on the above-described group feature 201 and the environment information 202. Examples of the group type include children, adults, an aligned group, a cumbersome group, and bicycles running side by side. Regarding the group types, information on features thereof is stored in a ROM in advance, and the information stored in this ROM is compared with a feature of a group moving object detected by the group detection unit 102 to determine a group type of the detected group moving object. The above-described group types are examples, and other group moving object types are also included in the present invention.

After determining the type of the target group moving object in the group type determination 203, the risk level determination 204 determines a risk level of the target group moving object based on the group type, a host vehicle speed, and a distance to the group. Information on the group type, the host vehicle speed, and the distance to the group is stored in the ROM in advance, and the risk level is determined based on the information stored in the ROM. Further, the host vehicle speed and the distance to the group change with the passage of time, this information is updated as needed to determine the risk level.

The vehicle control 205 controls a warning, a brake, and steering of the host vehicle based on the risk level obtained from the risk level determination 204.

Figure 3:
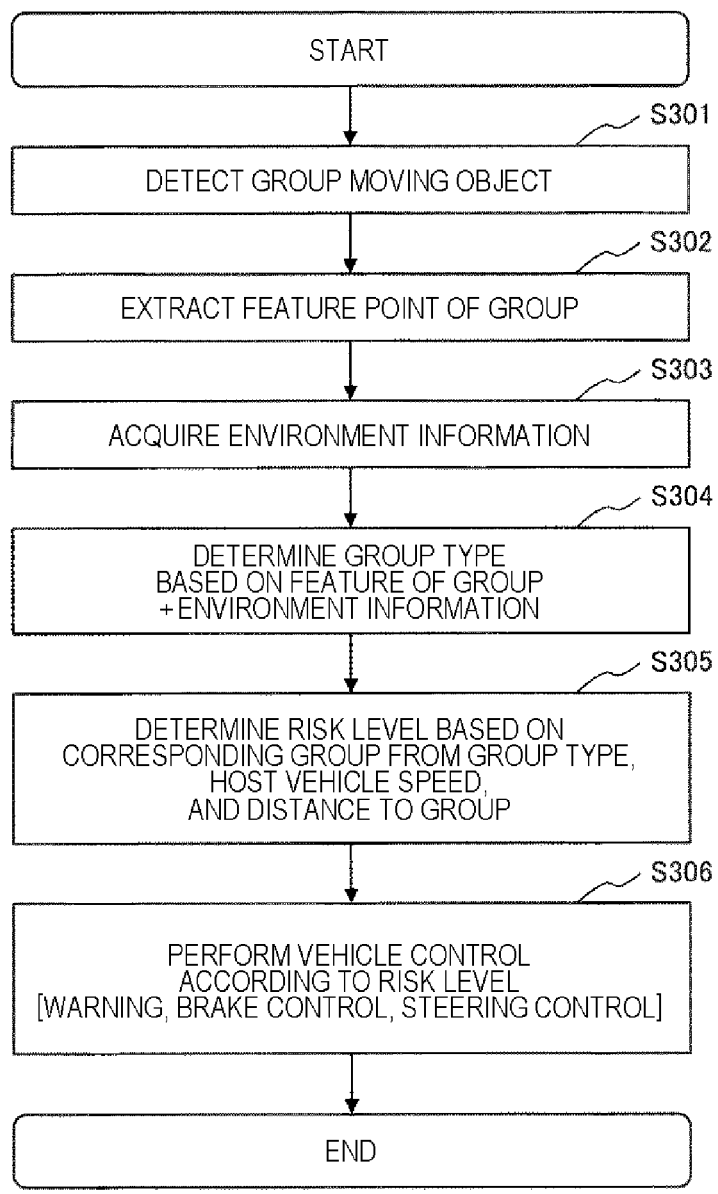
FIG. 3 is a flowchart of the vehicle control system according to the embodiment of the present invention.

Next, an operation of the present embodiment will be described. FIG. 3 is a flowchart of the vehicle control system according to the embodiment of the present invention.

In FIG. 3, the group detection unit 102 detects a group moving object from moving objects detected by the sensors 101 (Step S301). The group type determination unit 103 extracts a feature point of a target group (Step S302). The environment information collection unit 105 acquires environment information based on a sign, a signal, and the like detected by the sensors 101, and the map DB 12 (Step S303). Further, the group type determination unit 103 refers to the information on features of the group stored in the ROM in advance to determine a group type based on the group features and the environment information obtained by the environment information collection unit 105 (Step S304).

In the risk level determination 204, a risk level of the target group moving object is determined based on the information from the group type determination unit 103, the group type, a host vehicle speed, and a distance to the group (Step S305). Information on the group type, the host vehicle speed, and the distance to the group is stored in the ROM in advance, and the risk level is determined based on the information stored in the ROM. Further, the host vehicle speed and the distance to the group change with the passage of time, this information is updated as needed to determine the risk level. Then, the vehicle equipment control unit 108 performs a warning, brake control, and steering control according to the determined risk level (Step S306).

The vehicle control includes a warning to a driver, reduction of the host vehicle speed by the brake control, and control to increase the brake pressure with precaution for jumping-out of the group moving object, and control that keeps a safe distance to the target group by steering control.

According to the present embodiment, it is possible to determine the group type based on the features of the group moving object and surrounding environment of a host vehicle, and to control the vehicle according to such a situation. It is possible to determine that the group has a high risk of the jumping-out of the moving object depending on the group type, and it is possible to control the vehicle while predicting a behavior for the sudden jumping-out of the moving object.

Further, it is possible to provide the driver with safe traveling by giving a prior warning to the driver and controlling the vehicle for the target group moving object according to the present embodiment.

First Example

Figure 4:
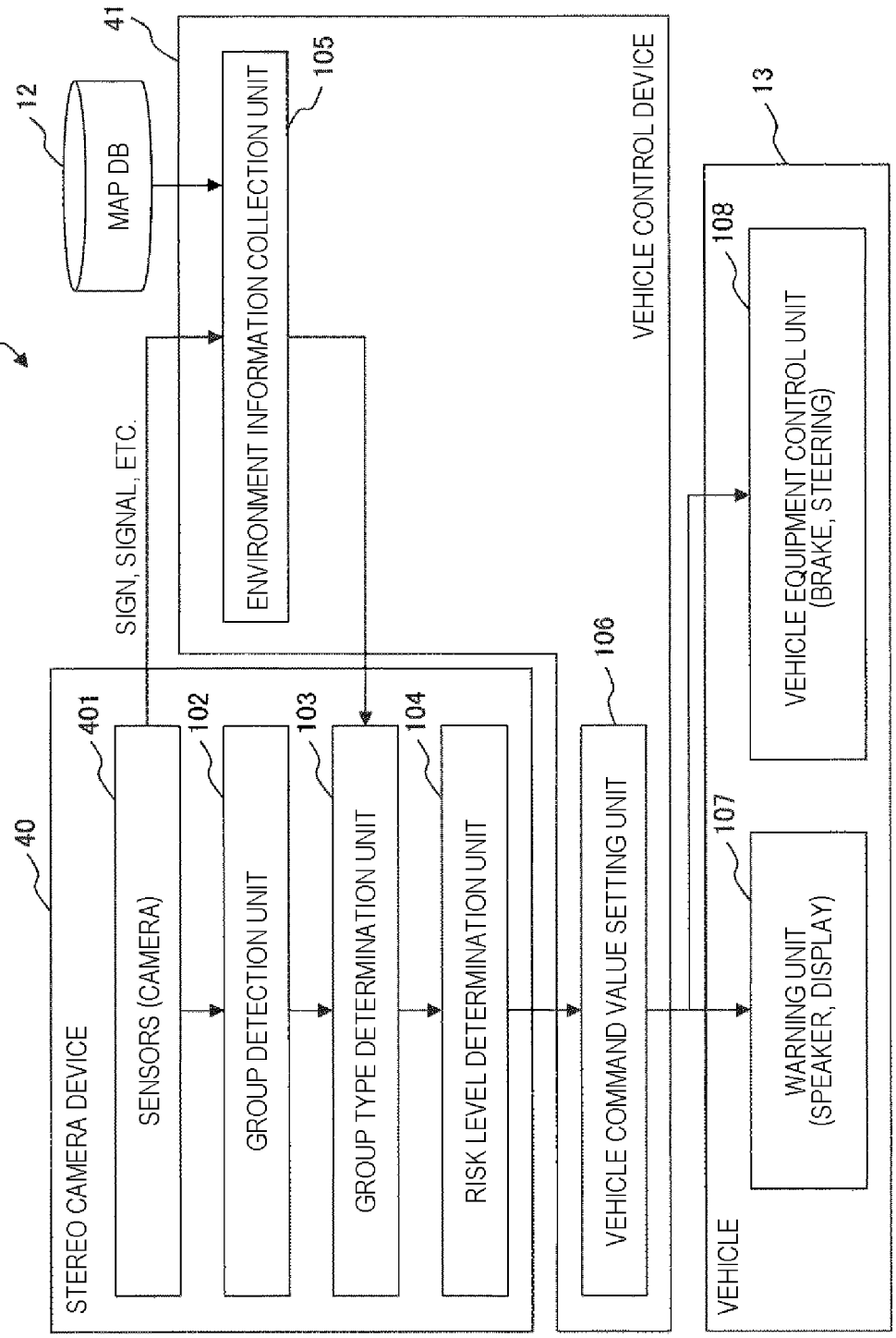
FIG. 4 is a block diagram of a vehicle control system according to a first example of the present invention.

Hereinafter, a first example of the present invention will be described with reference to FIGS. 4 to 8. In the vehicle control system 1 of the first example, an example in which a stereo camera and a vehicle control device are used as sensors will be described. FIG. 4 is a block diagram of the vehicle control system according to the first example of the present invention.

A stereo camera device 40 is formed of mechanisms of sensors (cameras) 401, the group detection unit 102, the group type determination unit 103, and the risk level determination unit 104. The content of each mechanism is as follows.

The sensors (camera) 401 detect a moving object, a sign, and a signal from an image signal of a sensor (camera), transmits information on the moving object detected by the camera to the group detection unit 102, and transmits information on the detected sign to the environment information collection unit 105.

The group detection unit 102 recognizes the presence or absence of a group moving object based on detection information of the moving object from the sensors (camera) 401 and extracts features of the group moving object when detecting the group moving object, and transmits information on the group features (width, height, movement of the group, and speed) to the group type determination unit 103 as information on the recognized group moving object.

The group type determination unit 103 determines a group type of the target group moving object based on the features of the group moving object obtained from the group detection unit 102 and environment information obtained from the environment information collection unit 105, and transmits information on the group type to the risk level determination unit 104.

The risk level determination unit 104 determines a risk level of a collision between the target group moving object and a host vehicle based on the group type obtained from the group type determination unit 103, a host vehicle speed, and a distance between the target group and the host vehicle, sets a vehicle control policy, and transmits the information thereof to the vehicle command value setting unit 106.

The vehicle control device 41 is formed of mechanisms of the environment information collection unit 105 and the vehicle command value setting unit 106. The content of each mechanism is as follows.

The environment information collection unit 105 sets environment information at a current position of the host vehicle based on the information of the map DB 12 and the information on the sign, and signal detected by the sensors 101, and transmits the environment information to the group type determination unit 103.

The vehicle command value setting unit 106 determines an actual control command value corresponding to the vehicle 13 from the control policy obtained from the risk level determination unit 104, and transmits a control signal to the warning unit 107 and the vehicle equipment control unit 108 of the vehicle 13.

The warning unit 107 and the vehicle equipment control unit 108 are provided as control mechanisms of the vehicle 13, and each mechanism is configured as follows. The vehicle 13 performs a warning using the warning unit 107 or vehicle control (brake control or steering control) using the vehicle equipment control unit 108 based on the control policy obtained from the risk level determination unit 104.

The warning unit 107 performs the warning to a driver in response to the control signal transmitted from the vehicle command value setting unit 106 using at least one means of a speaker that generates a voice or a warning sound, a display that displays the warning, and a vibrator that vibrates a steering wheel.

The vehicle equipment control unit 108 controls at least one of a brake device that applies a braking force to the vehicle 13 and a steering operation for avoiding a collision in response to the control signal transmitted from the vehicle command value setting unit 106.

Note that the stereo camera device 40 is equipped with the group detection unit 102, the group type determination unit 103, and the risk level determination unit 104 in the first example, but the vehicle control device 41 can be also equipped with the group detection unit 102, the group type determination unit 103, and the risk level determination unit 104, and the stereo camera device 40 can also be configured to transmit only information detected by the sensing information to the vehicle control device 41.

Next, an operation using a stereo camera will be described with reference to FIG. 5. FIG. 5 is an image view for describing an example using the stereo camera according to the first example of the present invention.

The stereo camera device 40 detects a target group moving object and acquires a width, a height, a movement, and a speed of a group which are features of the group. The environment information collection unit 105 of the vehicle control device 41 acquires information of the map DB and information on a sign obtained by the stereo camera as environment information.

In the first example, the stereo camera device 40 determines a group type of the target group moving object based on information on the features of the group and the environment information transmitted from the vehicle control device 41 as illustrated in FIG. 6. FIG. 6 is a matrix view of a group type corresponding to a feature point and environment information according to the first example of the present invention. This matrix view is stored in advance in the ROM of the vehicle control device 41, and the group type determination unit 103 determines the group type by referring to the information stored in the ROM and the information (feature point and environment information) obtained from the sensors 101 and the environment information collection unit 105.

In FIG. 6, for example, when a height is "low", a speed is a "walking speed", and map information and a sign of the environment information indicate a "school zone" as features of a group, the group can be determined to be a "children group" with a high probability and can be determined to be a group that needs to be noted.

Further, when a width is "wide", a movement of a group is "moving well", a speed is a "walking speed", and map information of the environment information indicates that "there is an event venue nearby", the group can be determined to be a "cumbersome group".

The vehicle control device 41 performs a warning to a driver, deceleration by brake control, securing a safe distance by steering control, and preparation for emergency braking (AEB) by increasing the brake pressure, for example, as illustrated in FIG. 7 based on the "group type" of the target group moving object obtained by the stereo camera device 40, the "host vehicle speed", and the "distance between the host vehicle and the group". FIG. 7 is a matrix view illustrating vehicle control corresponding to a group type, a host vehicle speed, and a distance to a group according to the first example of the present invention. This matrix view is stored in advance in the ROM of the vehicle control device 41, and the risk level determination unit 104 controls braking and steering according to a risk level by referring to the information stored in the ROM and the "group type", the "host vehicle speed", and the "distance between the host vehicle and the group".

FIG. 7 illustrates examples of a group of adults and a cumbersome group, for example. A group moving object that is determined to be a group of adults is unlikely to jump out and there is no disorder in the line. Thus, a warning to a driver, deceleration, and securing of a safe distance are not performed if a distance from a host vehicle is far and a host vehicle speed is 10 km/h to 60 km/h. On the other hand, the cumbersome group is highly likely to jump out onto a road where the host vehicle travels. Thus, preparation for emergency braking and the warning to the driver are performed even if the host vehicle speed is 10 km/h to 60 km/h, and deceleration and control to secure a safe distance are performed when the distance from the host vehicle is short or the host vehicle speed exceeds 10 km/h. In this manner, the vehicle is controlled according to the group type.

Figure 8:
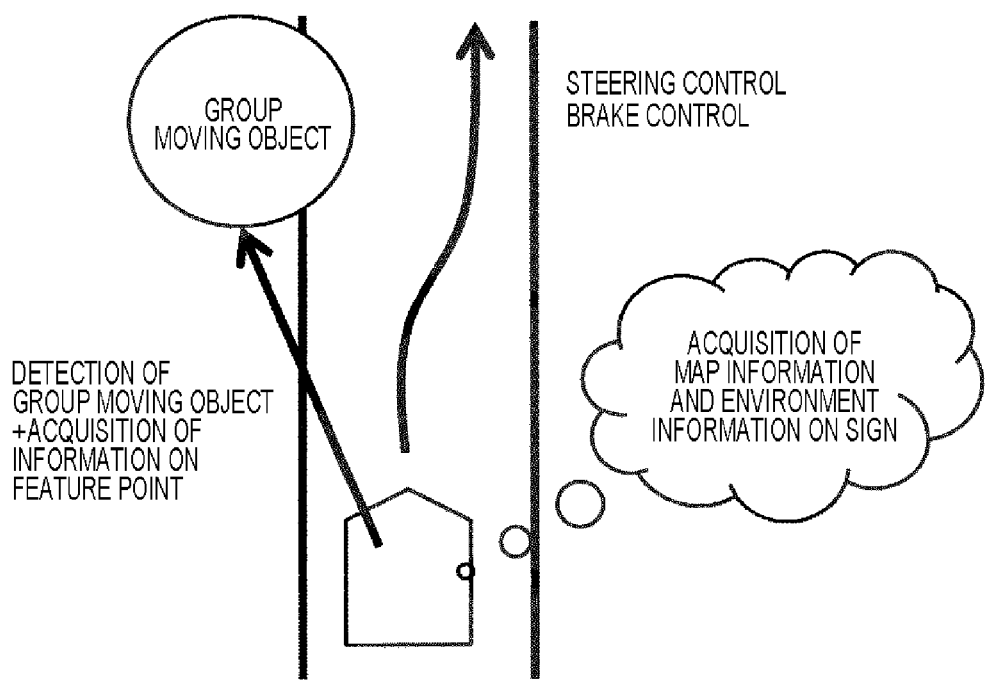
FIG. 8 is an image view of vehicle control according to the first example of the present invention.

The vehicle operation according to the first example described above is illustrated in FIG. 8. FIG. 8 is an image view of vehicle control according to the first example of the present invention. In FIG. 8, the sensors (cameras) 401 detect a group moving object in front of the vehicle, and the group detection unit 102 acquires information on a feature point of the group. The environment information collection unit 105 acquires map information and environment information of a sign, and the group type determination unit 103 determines a group type of the group moving object. The risk level determination unit 104 determines a risk level based on a host vehicle speed and a distance to the target group moving object, and the vehicle equipment control unit 108 performs steering control and brake control to avoid a risk in response to a command from the vehicle command value setting unit 106. As a result, safe traveling can be performed.

According to the first example, it is possible to determine the group type based on the features of the group moving object and surrounding environment of a host vehicle, and to control the vehicle according to such a situation. It is possible to determine that the group has a high risk of the jumping-out of the moving object depending on the group type, and it is possible to control the vehicle while predicting a behavior for the sudden jumping-out of the moving object.

Further, only the stereo camera device is used in the first example, but both a camera and a radar (millimeter-wave radar), for example, may be mounted. The millimeter-wave radar emits millimeter waves forward and measures reflected radio waves to detect an obstacle. Since the millimeter-wave radar is not easily affected by bad weather, the accuracy of group detection can be further improved when being used in combination with the camera.

Second Example

Figure 9:
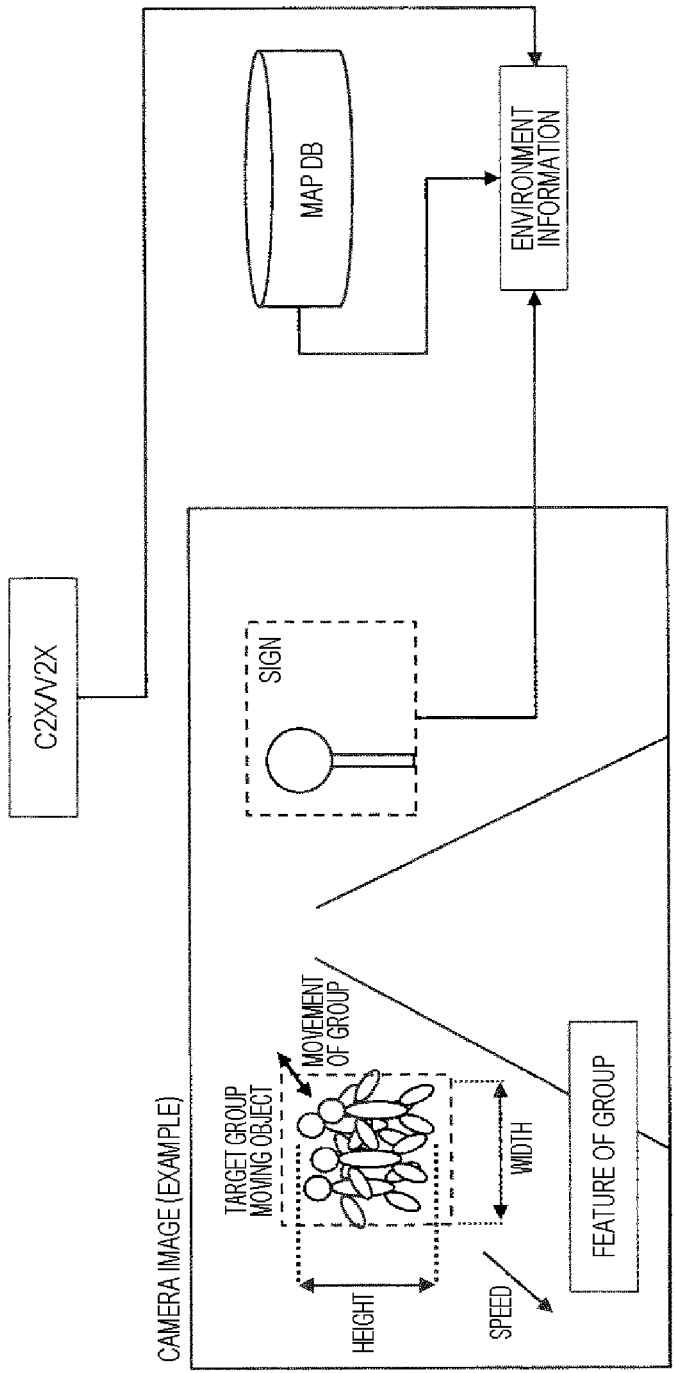
FIG. 9 is an image view in the case of using C2X and V2X according to a second example of the present invention.

Next, a second example of the present invention will be described with reference to FIG. 9. FIG. 9 is an image view in the case of using C2X and V2X according to the second example of the present invention. The second example is an example of the case of using C2X (Car to X) and V2X (Vehicle to X) which are vehicle communication systems that perform communication between a moving object such as a pedestrian and a vehicle.

In FIG. 9, in the second example, information on the vehicle communication systems (C2X and V2X) that perform communication between a group moving object and a vehicle (host vehicle) is used in addition to a map DB, a signal, a signal, and the like as environment information of the vehicle control system 1. In the second example, the vehicle control system 1 is provided with the vehicle communication systems (C2X and V2X). For example, a communication terminal that can know position information of a moving object grasps the exact position of the moving object to determine a group moving object and acquire this as environment information, so that it is possible to perform the similar vehicle control as in the first example. When C2X and V2X are used, the similar vehicle control as in the first example is performed, for example, when an event is held on a specific day and the host vehicle approaches on a date and time when the event is held. Further, it is also possible to perform control according to the time of going to and coming from the school.

Since C2X and V2X are incorporated as the environment information according to the second example, it is possible to control the vehicle according to the holding of the event or the like, and safety can be improved.

Third Example

Next, a third example of the present invention will be described with reference to FIG. 10. FIG. 10 is a block diagram of a vehicle control system for a vehicle according to the third example of the present invention. The third example is an example of the case of using a radar as sensors (radar) 1001.

In FIG. 10, the radar such as a millimeter-wave radar is used, instead of a camera, as the sensors (radar) 1001 of the vehicle control system 1 in the third example. When the radar is used, there is no function to detect a sign or a signal, and thus, only a map DB is used as environment information, which makes some configurations different. FIG. 10 is a block diagram of the vehicle control system in the case of using the radar according to the third example of the present invention.

The sensors (radar) 1001 detect a moving object by sensing of the radar, and transmit information on the moving object to the group detection unit 102.

The environment information collection unit 105 sets an environment at a current position of a host vehicle only from information of the map DB 12, and transmits information on the environment to the group type determination unit 103.

Since the other mechanisms and processes are the same as those in the first example, detailed descriptions thereof will be omitted.

Further, only the radar is used as the sensor in the third example, but a configuration in which both the camera and the radar are mounted may be adopted.

According to the third example, it is possible to determine a group type based on a feature of a group moving object and surrounding environment of the host vehicle, and to control the vehicle according to such a situation. It is possible to determine that the group has a high risk of the jumping-out of the moving object depending on the group type, and it is possible to control the vehicle while predicting a behavior for the sudden jumping-out of the moving object.

Further, it is possible to provide the driver with safe traveling by giving a prior warning to the driver and controlling the vehicle for the target group moving object according to the present embodiment.

Further, since only the radar is used as the sensor according to the third example, the system cost can be reduced.

Although the examples of the present invention have been described in detail with reference to the drawings as above, a specific configuration is not limited to the above-described examples, and design alterations or the like made in a scope not departing from a gist of the present invention is included in the present invention. For example, the above-described examples have been described in detail in order to describe the present invention in an easily understandable manner, and are not necessarily limited to one including the entire configuration that has been described above. Further, some configurations of a certain example can be substituted by configurations of another example, and further, a configuration of another example can be also added to a configuration of a certain example. Further, addition, deletion or substitution of other configurations can be made with respect to some configurations of each example.

REFERENCE SIGNS LIST 1 vehicle control system
10 vehicle control device
12 map DB
13 vehicle
40 stereo camera device
41 vehicle control device
101 sensors (camera, radar, etc.)
102 group detection unit
103 group type determination unit
104 risk level determination unit
105 environment information collection unit
106 vehicle command value setting unit
107 warning unit
108 vehicle equipment control unit
401 sensors (camera)
1001 sensors (radar)

The invention claimed is:

1. A vehicle control system that controls a host vehicle based on signals from sensors, comprising:
   the sensors;
   a memory;
   a network; and
   a processor communicatively coupled to the sensors and the memory via the network, and the processor is configured to:
      detect a group moving object based on the signals from the sensors;
      collect information on a surrounding environment of the host vehicle;
      determine a group type based on a feature of the group moving object and the environment information;
      determines a risk level based on the group type, a speed of the host vehicle, and a distance to the group moving object; and
   perform vehicle control of the host vehicle based on the risk level and the group type.

2. The vehicle control system according to claim 1, wherein the processor determines the group type according to a width, a height, a movement, and a speed of the group moving object.

3. The vehicle control system according to claim 1, wherein
   the sensors are cameras or radars.

4. The vehicle control system according to claim 2, further comprising
   a stereo camera device,
   wherein the stereo camera device includes the sensors, and the processor.

5. The vehicle control system according to claim 1, wherein
   the processor is further configured to perform a warning, and
   the warning is performed using at least one of a voice, a warning sound, a warning display, and a vibration to a steering.

6. The vehicle control system according to claim 1, wherein
   the vehicle control includes at least one of braking and steering control.

7. The vehicle control system according to claim 1, wherein
   the sensors are cameras, and
   the processor acquires sign information based on information from the cameras.

8. The vehicle control system according to claim 1, wherein
   a camera and a radar are used together as the sensors.

9. The vehicle control system according to claim 1, further comprising
   a vehicle communication system that performs communication between the group moving object and the host vehicle,
   wherein the processor acquires information for the vehicle communication system.

* * * * *